(12) United States Patent
Smith et al.

(10) Patent No.: US 7,921,333 B2
(45) Date of Patent: Apr. 5, 2011

(54) METHOD AND SYSTEMS FOR PROVIDING DATA REPLAY, REPROCESS AND RETRIGGER FUNCTIONS IN AN ANALYZER

(75) Inventors: Dale T. Smith, San Jose, CA (US);
Travis N. Ferguson, San Jose, CA (US);
David Christopher. Keenan, Bardon (AU)

(73) Assignee: JDS Uniphase Corporation, Milpitas, CA (US)

( * ) Notice: Subject to any disclaimer, the term of this patent is extended or adjusted under 35 U.S.C. 154(b) by 1048 days.

(21) Appl. No.: 10/804,481

(22) Filed: Mar. 19, 2004

(65) Prior Publication Data

US 2004/0243894 A1   Dec. 2, 2004

Related U.S. Application Data

(60) Provisional application No. 60/456,009, filed on Mar. 19, 2003.

(51) Int. Cl.
*G06F 11/00* (2006.01)

(52) U.S. Cl. ............. 714/39; 714/37; 714/43; 717/124; 717/129; 703/28

(58) Field of Classification Search ............. 714/39, 714/37, 43, 724; 717/124, 127, 129; 703/28
See application file for complete search history.

(56) References Cited

U.S. PATENT DOCUMENTS

| 5,157,779 | A | * | 10/1992 | Washburn et al. | 714/37 |
|---|---|---|---|---|---|
| 5,421,014 | A | | 5/1995 | Bucher | |
| 5,457,694 | A | | 10/1995 | Smith | |
| 5,671,376 | A | | 9/1997 | Bucher et al. | |
| 5,715,409 | A | | 2/1998 | Bucher et al. | |
| 5,896,552 | A | * | 4/1999 | Kowert et al. | 710/55 |
| 5,905,855 | A | * | 5/1999 | Klaiber et al. | 714/31 |
| 5,941,995 | A | * | 8/1999 | Morrison | 714/39 |
| 5,956,476 | A | * | 9/1999 | Ranson et al. | 714/30 |
| 6,105,087 | A | * | 8/2000 | Rivoir | 710/100 |
| 6,142,683 | A | * | 11/2000 | Madduri | 717/128 |
| 6,191,713 | B1 | * | 2/2001 | Ellis et al. | 341/100 |
| 6,236,694 | B1 | * | 5/2001 | Blatter et al. | 375/363 |
| 6,266,789 | B1 | | 7/2001 | Bucher et al. | |
| 6,304,655 | B1 | * | 10/2001 | Meek | 379/406.01 |
| 6,377,643 | B1 | * | 4/2002 | Lee et al. | 375/368 |
| 6,393,587 | B2 | * | 5/2002 | Bucher et al. | 714/39 |
| 6,421,793 | B1 | * | 7/2002 | Lester et al. | 714/37 |
| 6,507,923 | B1 | | 1/2003 | Wall et al. | |
| 6,519,723 | B1 | * | 2/2003 | Allred et al. | 714/712 |
| 6,687,856 | B2 | * | 2/2004 | Jibbe | 714/37 |
| 6,725,391 | B2 | * | 4/2004 | Swoboda | 713/500 |

(Continued)

OTHER PUBLICATIONS

HP E5200A Broadband Service Analyzer—Technical Data (May 1996).

(Continued)

*Primary Examiner* — Scott T Baderman
*Assistant Examiner* — Loan Truong
(74) *Attorney, Agent, or Firm* — Matthew A. Pequignot; Pequignot + Myers LLC

(57) ABSTRACT

A replay analyzer is disclosed. The replay analyzer is able to capture traffic from a transmission medium such as a buss and store it in a trace buffer. The replay analyzer can replay that captured data repeatedly as desired and can trigger activity based on patterns found in the captured data. If desired, the captured data may be used for purposes of traffic generation.

62 Claims, 10 Drawing Sheets

U.S. PATENT DOCUMENTS

| | | | |
|---|---|---|---|
| 6,732,307 B1 * | 5/2004 | Edwards | 714/724 |
| 6,792,563 B1 * | 9/2004 | DesRosier et al. | 714/43 |
| 6,820,251 B1 * | 11/2004 | Dwyer | 717/130 |
| 6,823,497 B2 * | 11/2004 | Schubert et al. | 716/4 |
| 6,826,717 B1 * | 11/2004 | Draper et al. | 714/39 |
| 6,912,673 B1 * | 6/2005 | Wyland | 714/43 |
| 6,918,065 B1 * | 7/2005 | Edwards et al. | 714/45 |
| 6,928,108 B2 * | 8/2005 | Nelson et al. | 375/222 |
| 6,937,688 B2 * | 8/2005 | Chen et al. | 377/116 |
| 7,080,283 B1 * | 7/2006 | Songer et al. | 714/30 |
| 7,096,264 B2 * | 8/2006 | Bonney et al. | 709/224 |
| 7,114,111 B2 * | 9/2006 | Noy | 714/738 |
| 7,349,889 B1 * | 3/2008 | Alling et al. | 706/46 |
| 2001/0016925 A1 * | 8/2001 | Bucher et al. | 714/39 |
| 2002/0007264 A1 * | 1/2002 | Swoboda | 703/28 |
| 2003/0097615 A1 * | 5/2003 | Corti et al. | 714/37 |
| 2003/0140280 A1 * | 7/2003 | Kaler et al. | 714/37 |
| 2003/0174694 A1 * | 9/2003 | Mitchell et al. | 370/352 |

OTHER PUBLICATIONS

Hewlett Packard Broadband Service Analyzer—User's Guide (Feb. 1996).

Bursky, Dave, "Single Instrument Analyzes Protocols and Logic" (Jun. 18, 2001) (10 pages).

* cited by examiner

METHOD AND SYSTEMS FOR PROVIDING DATA REPLAY, REPROCESS AND RETRIGGER FUNCTIONS IN AN ANALYZER

CROSS REFERENCE TO RELATED APPLICATIONS

This patent application claims priority and benefit under 35 U.S.C. §119 to U.S. Provisional Patent Application Ser. No. 60/456,009 filed on Mar. 19, 2003, and that patent application is hereby incorporated by reference in its entirety.

BACKGROUND

This disclosure relates to capturing data traffic on a bus or other transmission medium and analyzing that data. Various techniques are disclosed.

SUMMARY

Data travelling on a bus or other transmission medium may be captured for analysis. As part of that analysis, captured data may be stored in a memory location from which it may be replayed or reprocessed as desired. A retrigger function may be included. Such a system may be called a "Replay Analyzer" for convenience of reference in this document. A Replay Analyzer is able to perform post-capture analysis using much of the same powerful logic and circuitry used during the capture for triggering, monitoring, and statistics.

BRIEF DESCRIPTION OF THE DRAWINGS

FIG. 2 also shows the Event Statistic Counters.

DETAILED DESCRIPTION

The example implementation and features of a Replay Analyzer discussed herein will be easier to understand with some background on possible benefits that may be achieved through use of a Replay Analyzer. Unlike general-purpose analyzers (e.g. logic analyzers), bus-specific protocol analyzers often provide additional features beyond capture-and-display capability. Those additional features may include: 1) real-time protocol monitoring, 2) real-time statistical analysis, and 3) traffic generation capabilities. Some protocol analyzers may also add additional value to the traffic generation capability by providing methods for replaying the captured traffic during traffic generation mode.

The Replay Analyzer brings these features to a general-purpose analyzer which can be used for any bus or transmission medium, while simultaneously speeding up the post-capture processing of trace data by replaying and processing it at high-speed. The Replay Analyzer also decreases the complexity of the user interface (increasing the ease-of-use) by ensuring a significant commonality in the user interface for controlling the normally separate functions of real-time monitoring, off-line analyzing, and generating traffic. This may be achieved through new hardware techniques which make it possible to share the hardware resources used for real-time monitoring and statistics, post-capture analyzing, and replaying saved traffic. This commonality provides the additional benefit of decreasing the system cost by increasing the utilization of each hardware function.

Figure 1:
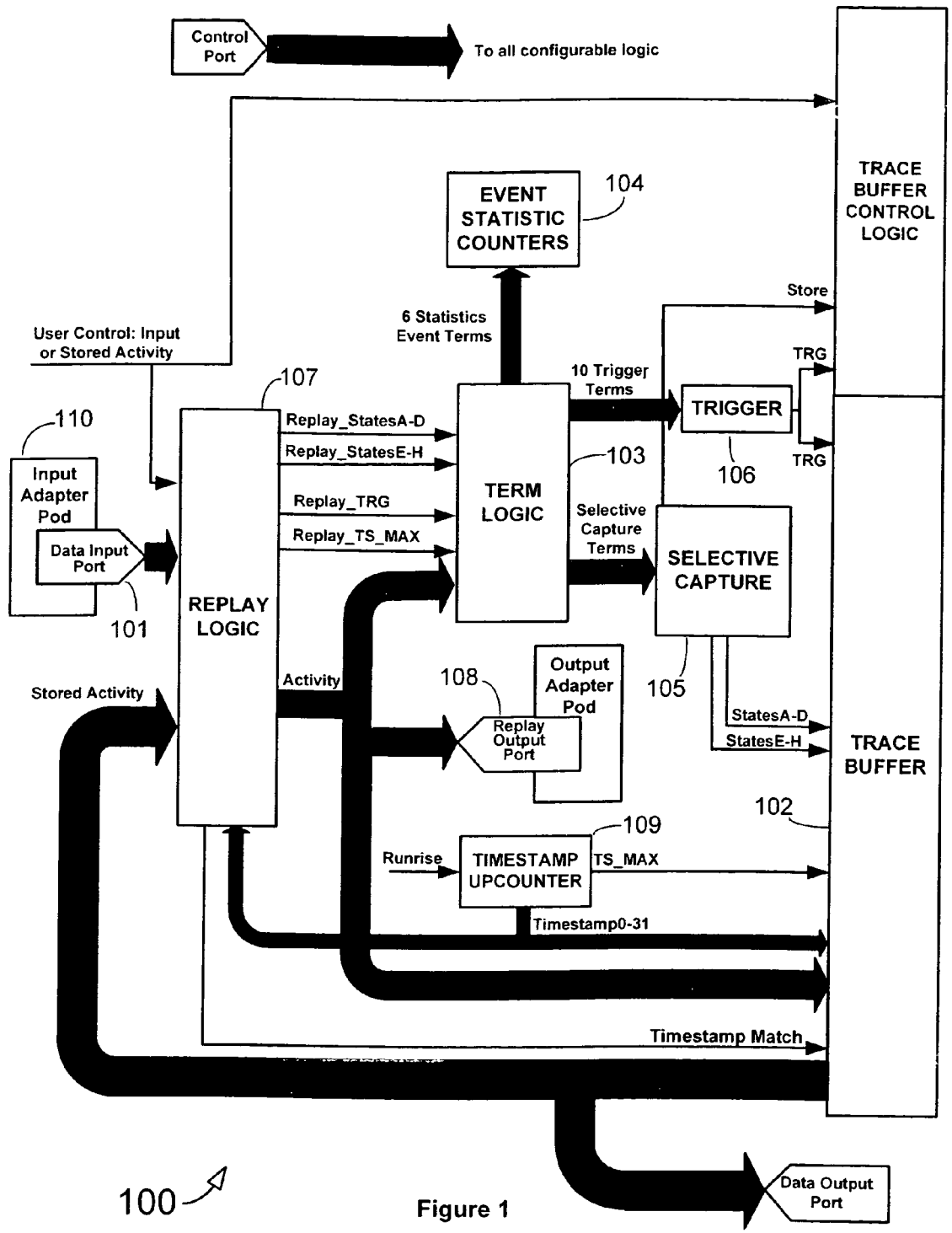
FIG. 1 is a block diagram of an example Replay Analyzer showing the main interconnections between the blocks and showing the data flow for input data and replay data.

High-Level Functions:

FIG. 1 depicts a block diagram 100 of an example Replay Analyzer. As shown in FIG. 1, the primary blocks in the Replay Analyzer are the Data Input Port 101, Trace Buffer 102, Term Logic 103, Event Statistic Counters 104, Selective Capture Logic 105, Trigger 106, Replay Logic 107, Replay Output Port 108, Timestamp Upcounter 109, and Control Port 110. Those familiar with protocol analyzers, monitors, and traffic generators, will recognize that the Replay Analyzer eliminates a number of logic blocks typically used to provide the analyzer's feature set. For example to generate traffic, no separate buffer or state machine is required for generated packets. For fast trace statistics, there are no separate statistics counters, terms, or content-addressable memory, since the Event Statistic Counter 104 hardware performs this same function on the trace by gathering replay statistics. Hardware search logic is not required due to the replay analyzers ability to use the trigger for fast event gathering operations. For fast data gathering or filtering, the replay statistics counters or replay trigger can be used to identify specific data values or events. For very fast creation of a Trace Histogram, or for locating commands, the replay statistics and replay trigger functions can be used to gather histogram and command data.

The Replay Analyzer may be coupled to a transmission medium (bus) through an adapter pod. Using an adapter pod, almost any bus can be analyzed or emulated (replayed) including wired, wireless, and optical mediums, as long as the analyzer has sufficient bandwidth. Although separate input and output pods may used, it is also straightforward to use a single pod with bidirectional I/O channels, instead of an Input pod for the Input Channels, and an Output pod for the Output Channels.

The analyzer's bandwidth, and ability to support busses of the future, is a function of the number of channels used in the input port, the sample rate, and the speed that the input channels can be processed at. The versatility of being able to support various busses is made possible through the combination of the adapter pod, input channels, and the Term Logic. The Term Logic performs pattern recognition for the other analyzer functions that process incoming or outgoing data. For example, the Event Statistic Counters provide long-term statistics regarding the types of events occurring, with each event type being defined by a term. Term events can be commands, packets, addresses, data transfers, signal assertions, or any other occurrence that can be defined as a pattern on the incoming channels.

The Selective Capture logic uses terms from the Term Logic to capture only incoming activity that matches predefined or user defined patterns, thus ensuring the Trace Buffer is utilized to store only useful data, and filter everything else.

The Trigger Sequencer is used to trigger on an event or sequence of events and eventually stop the Trace Buffer Controller from continuing to increment the Trace Buffer address and write (during capture) or read (during replay) the Trace Buffer memory. Whether the Trace is being written or read depends on whether the analyzer is in Capture Mode or Replay mode. The time between the trigger and when the capture or replay is halted depends on the value in the Post-Trigger Counter.

The Replay Logic provides a means for selecting the data flow source and direction, either from the Data Input Port and into the Trace Buffer and trigger or trigger Term Logic, or out of the Trace Buffer and into the trigger or, trigger Term Logic. The Replay Logic also optionally assists in ensuring that each trace event is replayed with the same timing it was captured with.

The Replay Output Port provides the replayed trace data to an Output Adapter Pod, which provides the physical connection to the bus, and any serialization and signaling conversion necessary, depending on whether the bus medium is analog or digital, wired or wireless, optical or electrical, single-ended or differential. The Output Adapter Pod generally performs the inverse functions of the Input Adapter Pod, taking the replayed data from the Trace Buffer and converting it back to the original format that was presented to the Input Adapter Pod.

The Control Port provides a bus structure whereby a local or remote user or processor can configure the replay analyzer logic.

By providing the above structure and functionality, the Replay Analyzer permits a user to capture data moving across a bus and replay it through the analyzer multiple times to look for desired data patterns and to perform other analysis of the data. The replay function permits construction of a far simpler analyzer hardware than would be used if either a hardware or software search function were implemented.

Figure 2:
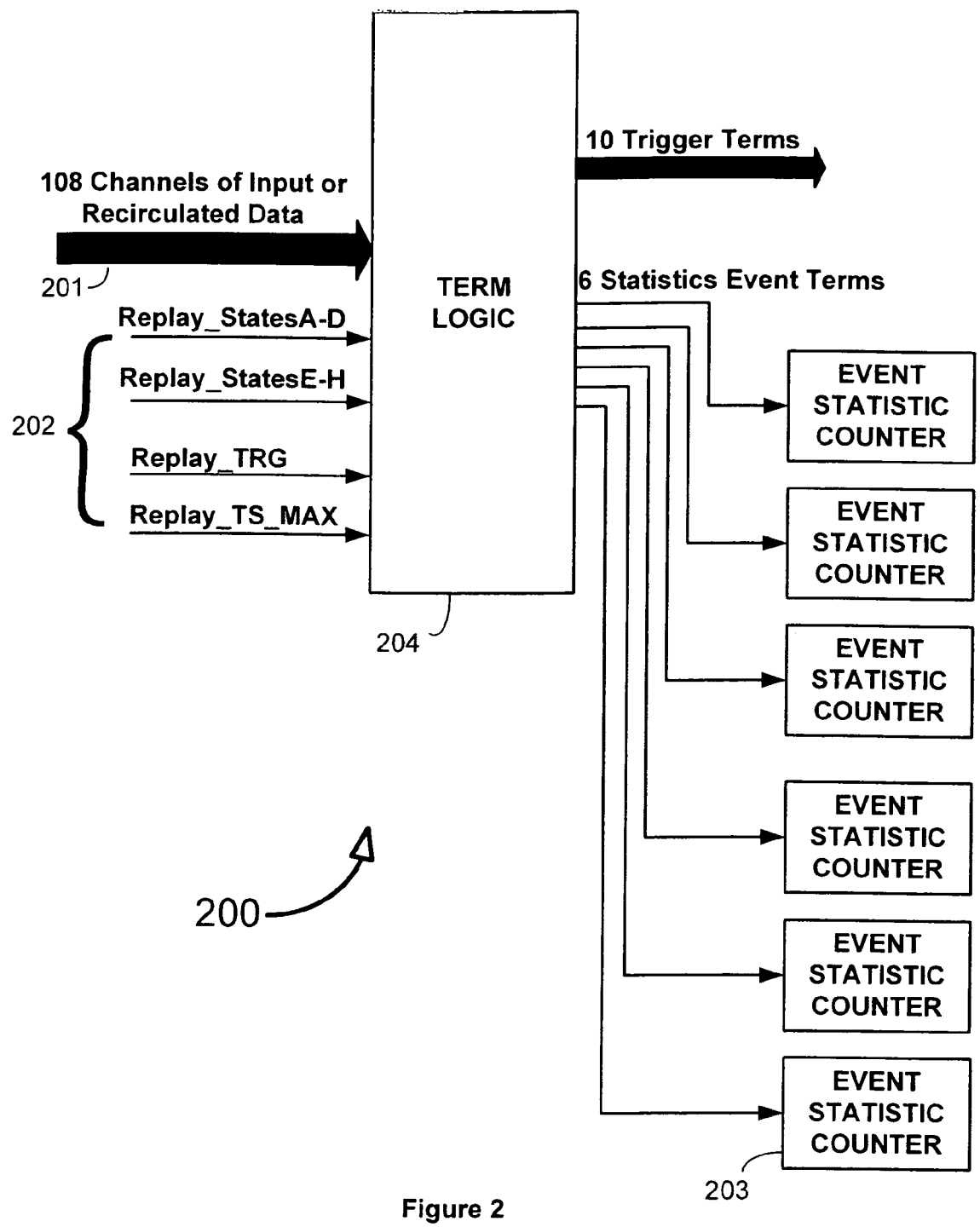
FIG. 2 is a block diagram of example term logic of the example Replay Analyzer showing the inputs and outputs.

Term Logic:

FIG. 2 depicts a block diagram 200 of example term logic of the example Replay Analyzer showing the inputs and outputs and the Event Statistic Counters 203 through Term Logic 204. As shown in FIG. 2, the terms are used to perform event pattern recognition on the I/O channels. The example Replay Analyzer has 108 I/O channels 201, which when combined with the 32 Timestamp bits, StatesA-D and StatesE-H bits, TRG bit, and TS_MAX bit, add up to 144 bits, which is a width that maps into two 72-bit SDRAMS. Other channel width configurations may be a better fit for different buffer implementations. In an example implementation, the terms can mask any I/O channel from comparison, or compare any channel against an expected edge or level. Each term can be configurable to compare each I/O channel against any of the following possibilities—High, Low, Rising Edge, Falling Edge, Either Edge or DontCare. Also, each I/O channel of the term can be configured to perform compares of levels (High or Low) using either the current or previous value of the I/O channel. This makes it possible to configure a term so that it compares the levels during the setup time or hold time with respect to the edge comparisons.

Figure 3:
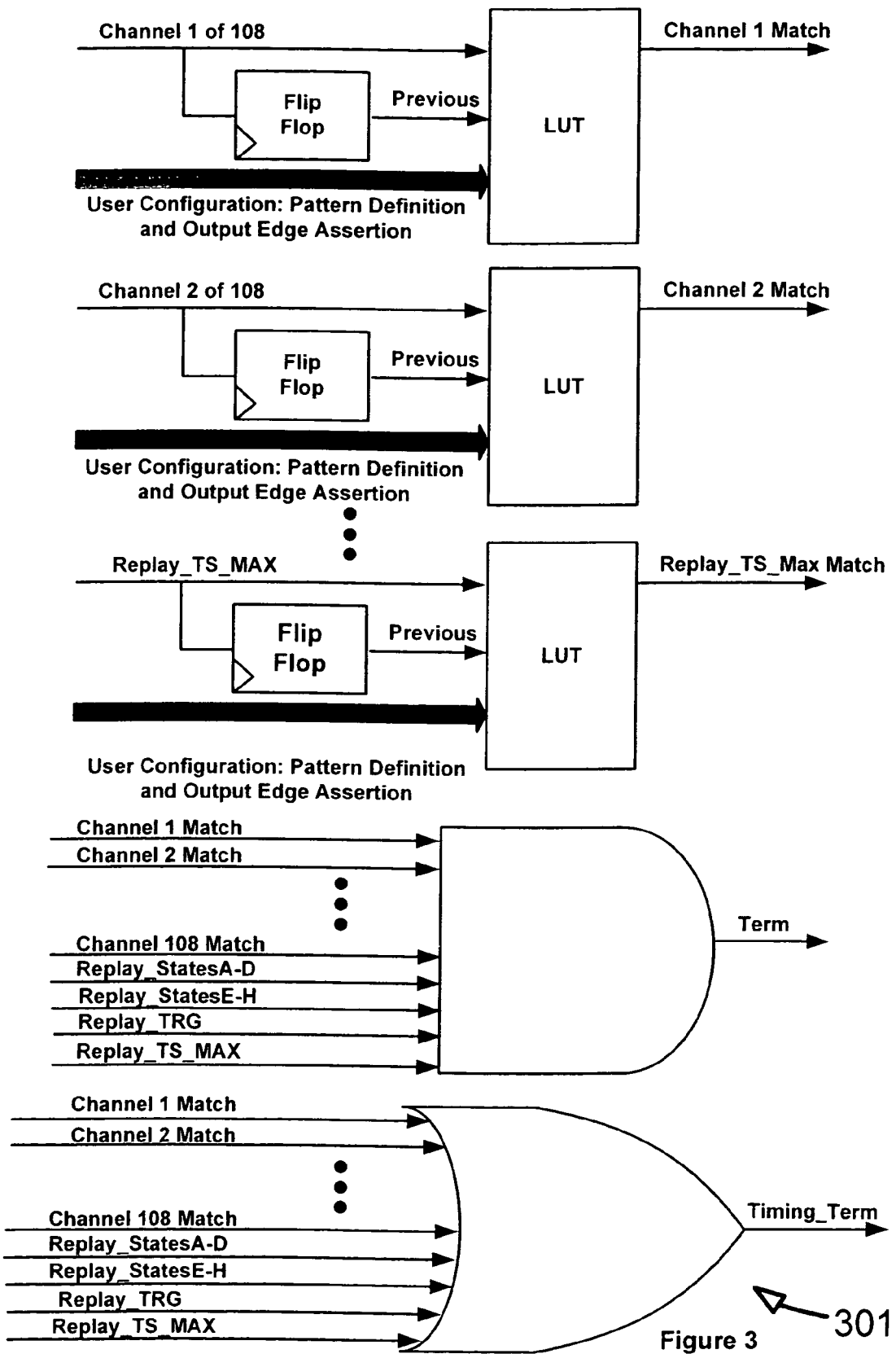
FIG. 3 shows the detail of example Term Logic in a Replay Analyzer.

FIG. 3 shows the detail of example Term Logic in a Replay Analyzer. As shown in FIG. 3, the Term Logic 301 can use all the incoming channels as inputs during capture. During replay operations Term Logic can use the replay channels as well as some replay status signals such as Replay_TRG, which is asserted once the Trigger event occurs, or Replay_TS_MAX which indicates a Timestamp rollover, or Replay_StatesA-D and Replay_StatesE-H which indicate which set of states caused the capture, where each set of states is defined for a different purpose, such as capturing different directions of a bidirectional bus. During initial capture of bus data, only the non-replay signals are used to define the term, and the replay signals are configured to the DontCare condition. During replay operations the replay signals aid in processing functions, for example Replay_TS_MAX is used in determining the total length of time taken by the trace, by counting the number of times the timestamp rolled over. Replay_TRG indicates where the trace triggered during capture. Replay_StatesA-D and Replay_StatesE-H indicate what type of event caused the capture, for example, if StatesA-D are defined as transfers on the buss's transmit direction, and StatesE-H are defined as the transfers in the receive direction, then the Replay_StatesA-D signal will be asserted only for valid transfers in the transmit direction, thus making it possible to define replay terms that are only asserted for valid transfers in the desired direction, and not asserted if the transfer is in the opposite direction, or not valid for some other reason such as a timestamp rollover (TS_MAX), or a timing mode capture of a channel transition at a different time than during the valid data transfer.

As shown in FIG. 3, a term is the assertion of a term signal, where the term signal represents a match between the I/O channels and the programmed compare value for the term. All terms except the Timing Term use a logical AND of the individual I/O channels to create the final term signal. The Timing Term is asserted when an edge occurs on any of the I/O channels, so the timing term uses a logical OR of the I/O channels, and each channel input to the Timing Term is typically configured to be true when either edge (rising or falling) appears on the channel. For all terms, the "D" flip-flop on the input of each term channel is used to provide a delayed version of the incoming signal, making it possible for the term to detect an edge by detecting that the current signal level is different than it was previously.

Adapter Pod(s):

An adapter pod 110 of FIG. 1 can be used to interface the Replay Analyzer to the physical characteristics of the bus being analyzed or transmitted on. An Input Adapter Pod is used for analyzing, and an Output Adapter Pod is used for transmitting. Each analyzer channel can include a differential signal, and cabling can be used to connect to the pod. Or a single ended signal can be used for each channel, with the pod connecting directly to the analyzer, thus eliminating the loss and crosstalk associated with cables. The pod performs the signal conversion from the differential signaling used by the analyzer, to the method used by the bus, which may be analog or digital, single-ended or differential, parallel or serial, wired or wireless or optical. Each method has its own special transceivers and adaptive requirements for the transmission medium being used. For example, gigabit serial busses typically require that the analyzers input channels be deserialized using a PHY or SERDES, and the output channels must be serialized again using a PHY or Serializer. Techniques for serializing and deserializing are commonly known in the art of gigabit busses. For optical busses, special optical transceivers are typically employed, which may or may not have the SERDES built into the optical device. Fibre Optic cable is the typical medium for optical transmission lines. For wireless mediums, transmitters and receivers are employed in the adapter pods using suitable antennas as the connection to the medium. For analog transmissions Analog-to-Digital Converters (ADC's) are typically used to convert the analog signal to the parallel digital transmission of the Replay Analyzer. In the output direction, Digital-to-Analog Converters (DAC's) are used. These methods of converting a parallel digital electrical bus to a non-copper or non-parallel or non-digital or non-electrical medium are well known in the art.

In addition to converting the bus signaling to the parallel differential format, the Input Adapter pod for many busses includes logic which creates special signals that aid the decoding, triggering, filtering, and statistics functions of the analyzer, by making it possible for a single term to recognize that a specific captured event has special meaning due to its position in a sequence of events. For example, serial busses often transmit packets of information, and the Input Adapter Pod will deserialize the packets into 32-bit chunks, called Double-Words, or D-words. In order to process the information in each D-word, it is useful for each D-word to be transmitted to the analyzer with accompanying count bits that indicate which D-word in the packet this D-word is. These count bits are created by the Input Adapter pod and sent with the D-word to the analyzer so that the terms can use the count bits to know which D-word in the packet it is. For example, if the user wants to define a Term as being a specific value in the Address Field of the Packet Header, the count bits can be used to identify which D-Word is the Address Field. In a similar manner, the Input Adapter pod can create protocol specific meanings for the Input channels such as "Command" or "Status" or "Error". Groups of input channels can be created by the Input Adapter pod, for example a 2-bit group called "Error" may use a 2-bit pattern of 00 to mean No Error, a pattern of 01 means Coding Error, 10 means Disparity Error, and a pattern of 11 means Primitive Error. This group makes it possible for the logic in the pod to decode the 8$b$/10$b$ coding used by most gigabit busses and provide signals to the analyzer which help it trigger on specific types of bit or byte error conditions. Generally, the Input Adapter pod is responsible for providing any bus-specific decoding of the bus signaling that must occur in real-time. For triggering purposes, the trigger sequencer can also be used to trigger on sequences of events that aren't decoded by the pod, which significantly increases the decoding power of the analyzer during both Capture and Replay operations.

Figure 4:
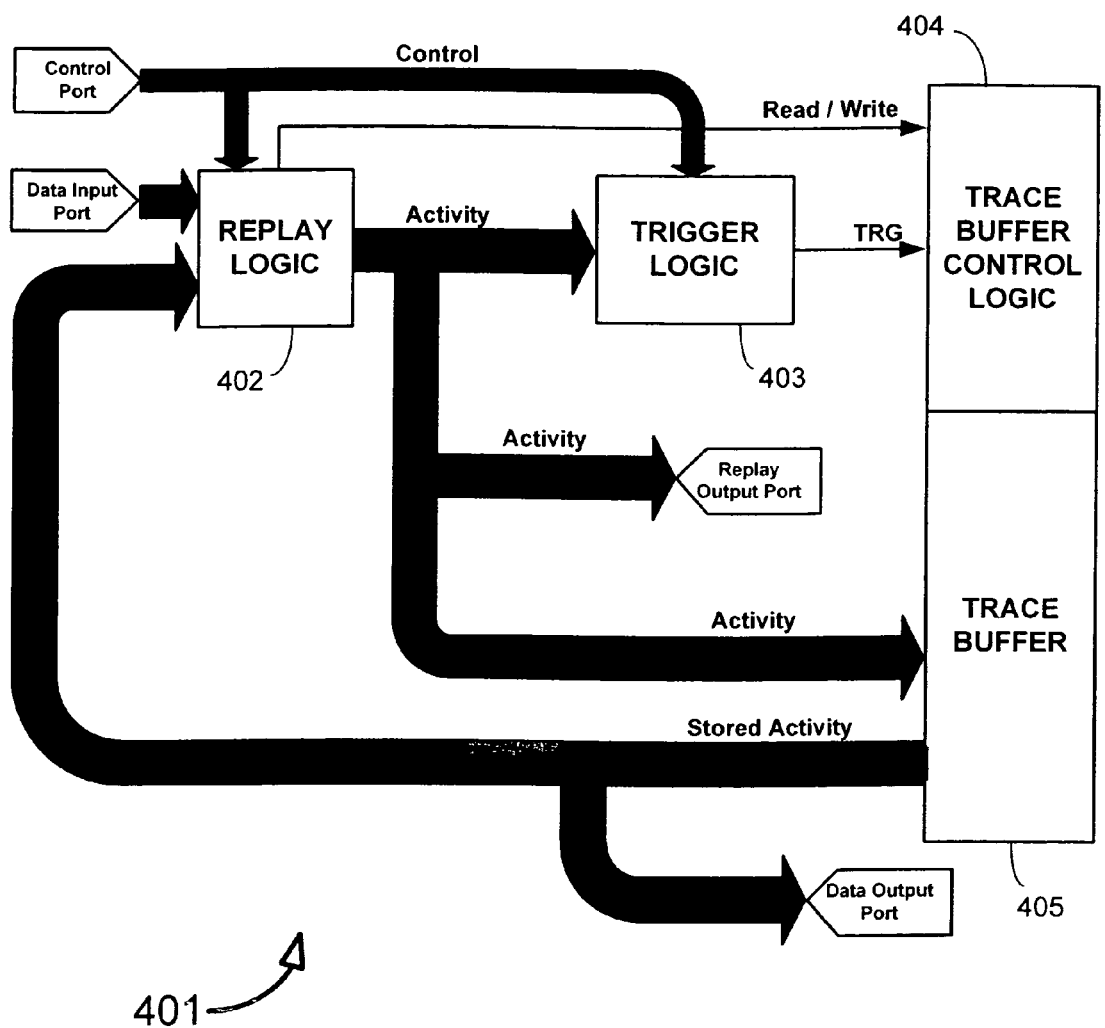
FIG. 4 is a simpler alternative implementation of the Replay Analyzer which does not include the Selective Capture Logic, and does not include the logic associated with correctly timing the replay.

Selective Capture Logic:

Capturing traces can be done in State Mode, Transitional Timing mode, Fixed Frequency mode, or otherwise as desired. State Mode and Transitional Timing mode both rely on a Timestamp for each captured event in order to display or replay the data with the correct timing. Fixed Frequency mode performs a capture on each clock cycle of the 250 MHz sample clock, thus no timestamp is required to display or replay the data with correct timing. FIG. 4 shows a simpler alternative implementation of a Replay Analyzer 401 with a reduced number of blocks required to perform replay operations, since the data is captured at a fixed frequency. It includes replay logic 402, trigger logic 403, trace buffer control logic 404 and trace buffer 405. Note that patterns in the trace buffer (which represent patterns found in bus traffic) are found by replaying the contents of the trace buffer and analyzing them with trigger logic 403 rather than by a search function.

Figure 5:
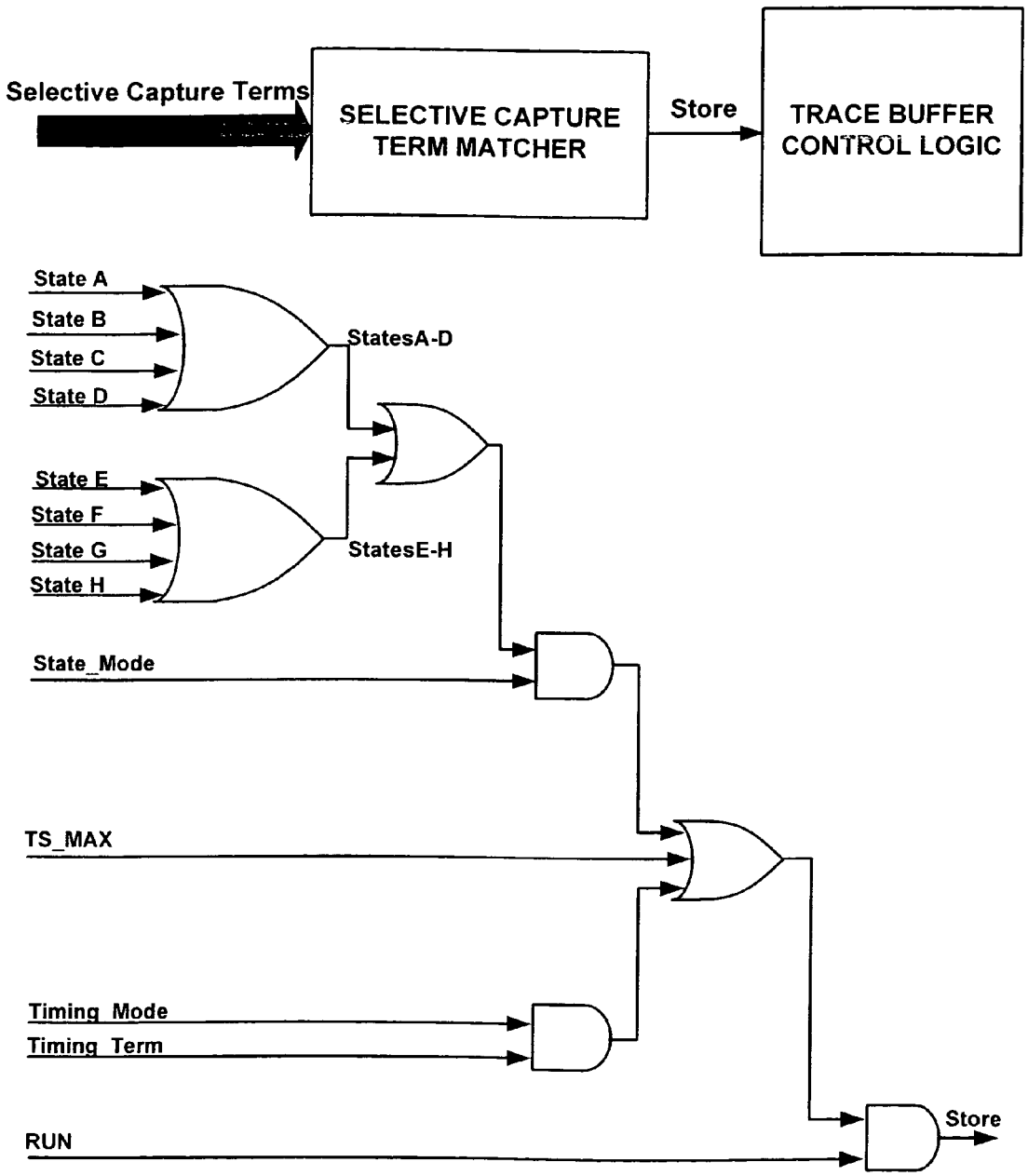
FIG. 5 shows example Selective Capture logic which generates the STORE signal for a Replay Analyzer.

Referring now to FIG. 5, example details of a Trigger Logic implementation are depicted via a logic diagram 501. Trigger Logic asserts a trigger signal when the data presented to it matches a predefined pattern or sequence. Fixed Frequency mode can be implemented by selecting the State Mode of capture, and then configuring one of the state terms as all DontCare values. This causes the STORE signal generated by the Selective Capture Logic to always be true, and the Trace Buffer Controller will then store every 4 ns (250 MHz) sample. The Timestamp Upcounter is a 32-bit counter that rolls over to 00000000h when it reaches the FFFFFFFFh terminal count. The Timestamp Upcounter is initially reset to zero on the rising edge of RUN by the RUNRISE signal. A signal called TS_MAX (short for TimeStamp Max) is asserted on the rollover to 00000000h. Since TS_MAX causes a capture in any of the capture modes, and since TS_MAX is stored in the Trace Buffer, it is easy for software to show much longer timestamps than the 32-bit counter can count by itself, by counting the number of rollovers that have occurred in the trace up to any specific event. The Replay Trigger can be used to count these TS_MAX occurrences quickly since Replay_TS_MAX (the version of TS_MAX which is output by the buffer during replay) is an input to all Terms. At the beginning of a capture or replay, the Timestamp Upcounter is reset to 00000000h when the RUN signal is first asserted, and from then until the end of the trace it counts every cycle of the 250 MHz sample clock.

The State Mode of capture can use the Selective Capture Logic in FIG. 5, to identify and capture only the bus traffic that matches the patterns loaded into the state terms. In State Mode, the eight state terms (A thru H) are ORed together to generate the STORE signal, thus a STORE occurs for each clock cycle that a state term is true. The eight state terms are grouped into two groups, called StatesA-D, and StatesE-H. By configuring each group of state terms to match only the data corresponding to a single direction of a bidirectional bus, the Replay Analyzer can capture both directions simultaneously, using an Input Adapter pod which uses 54 of the 108 input channels for one direction, and the other 54 input channels for the other direction. Two signals are stored in the Trace Buffer along with the input channels called StatesA-D and StatesE-H. Since the first four states (A thru D) are used to capture traffic in one direction, the StatesA-D signal, which is an OR of the first four state terms, will only be asserted in the Trace Buffer when the 54 channels corresponding to States A-D contain valid data. The 54 channels for States A-D could be invalid if it was States E-H that caused the capture. If both the StatesA-D and StatesE-H signals are valid for the same event in buffer memory, then valid data was transferred in both directions simultaneously on the bus. Each of the 8 state terms can be configured to qualify its channels either before the edge, or after the edge of the signal used to strobe the data into the analyzer. Since all 108 channels can be configured as an edge, any of the 108 channels can be used as the data strobe. Typically, only one signal will be used as a strobe and the rest will be configured as levels, or as DontCare signals.

The Timing Mode of capture uses the Timing Term instead of the State Terms to generate the STORE signal. The Timing Term is configured to go true whenever an edge occurs on any of the input channels. An edge is defined as any input where the level of the input during the previous sample is different than the current sample. Since each event stored is timestamped, it is easy for software to reconstruct a timing waveform of the signal activity from the Timing Mode trace data, which is especially useful for troubleshooting bus timing problems such as setup or hold time violations.

Figure 10:
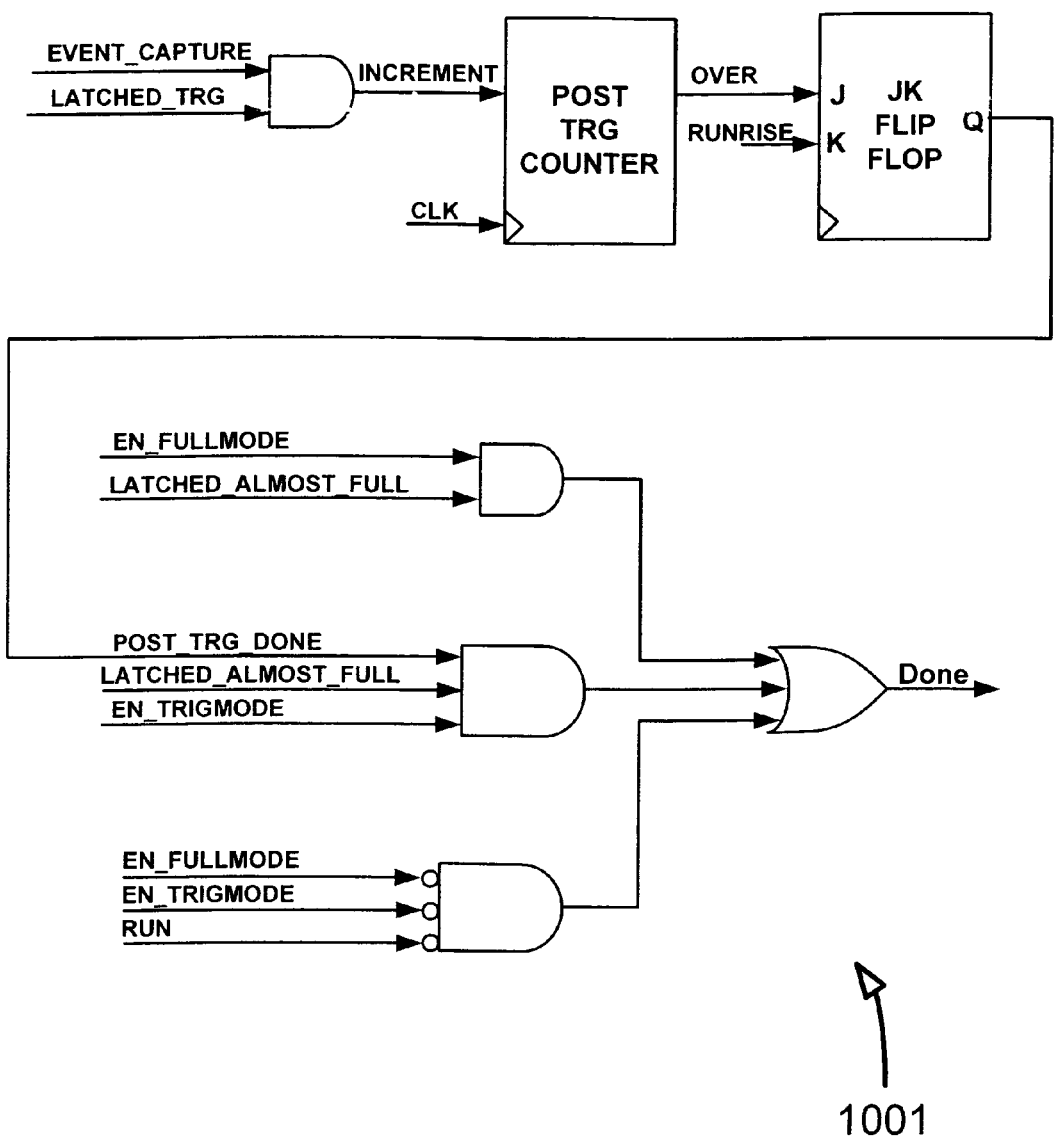
FIG. 10 is example detail of the Stop Logic function in a Replay Analyzer.

Stopping the Trace or Replay:

Example Stop Logic 1001 is shown in FIG. 10. The Stop Logic generates the DONE signal which tells the Trace Buffer Controller to halt a capture or replay operation. The Replay Analyzer can be configured to stop capturing when the Trace Buffer is full. This configuration is performed by the host by writing a register which sets the EN_FULLMODE bit. During a capture or replay in this mode, DONE will be asserted when the LATCHED_ALMOST_FULL signal is asserted by the Trace Buffer Controller. Capture and Replay can also be configured to loop on the Trace Buffer until the operation is stopped by the user in Manual Stop mode, or by the Trigger in Stop After Trigger mode. In Stop After Trigger mode, a Post Trigger Counter is used to stop the capture or replay some number of events after the trigger occurs. The Post Trigger Counter is loaded by the host when the user selects the ratio of Pre-Trigger and Post-Trigger data he wants to see in the buffer once the capture is complete. Typically, in replay mode the Post Trigger Counter is loaded such that the replay stops only after the desired number of addresses corresponding to a trigger match have been latched into the TRG ADDRESS FIFO. The assertion of the Post Trigger Counter output is latched and then generates the DONE signal by being ANDed with the EN_TRIGMODE signal, which is from a register written by the host, and ANDed with the LATCHED_ALMOST_FULL signal, which indicates the buffer has reached the end or wrapped at least once during the operation. The LATCHED_ALMOST_FULL signal ensures that the entire trace buffer is utilized during a capture even if the Trigger occurs before the desired amount of Pre-Trigger data is captured. During replay, the LATCHED_ALMOST_FULL signal is forced high so the replay can be stopped without reaching the end of the buffer or wrapping. In all modes, the user can stop the capture manually by pressing the STOP button which causes the host to simultaneously deassert EN_FULLMODE, EN_TRIGMODE, and RUN, which asserts the DONE signal. When DONE is asserted, the Trace Buffer Controller disables further writing or address incrementing. During trace capture the LATCHED_ALMOST_FULL signal is generated by latching the output of a comparator which compares the current Trace Buffer address with a LAST_ADDRESS register which gives the stop logic sufficient time to stop before the Trace Buffer address counter wraps to the beginning again. In all modes, once the trace is stopped, host software reads the current address value to determine which address is the last captured address in the trace. In Stop After Trigger mode, when the Trigger signal is asserted a post-trigger upcounter is enabled. When the post-trigger upcounter overflows, the DONE signal is asserted, disabling further writing or address incrementing.

Figure 6:
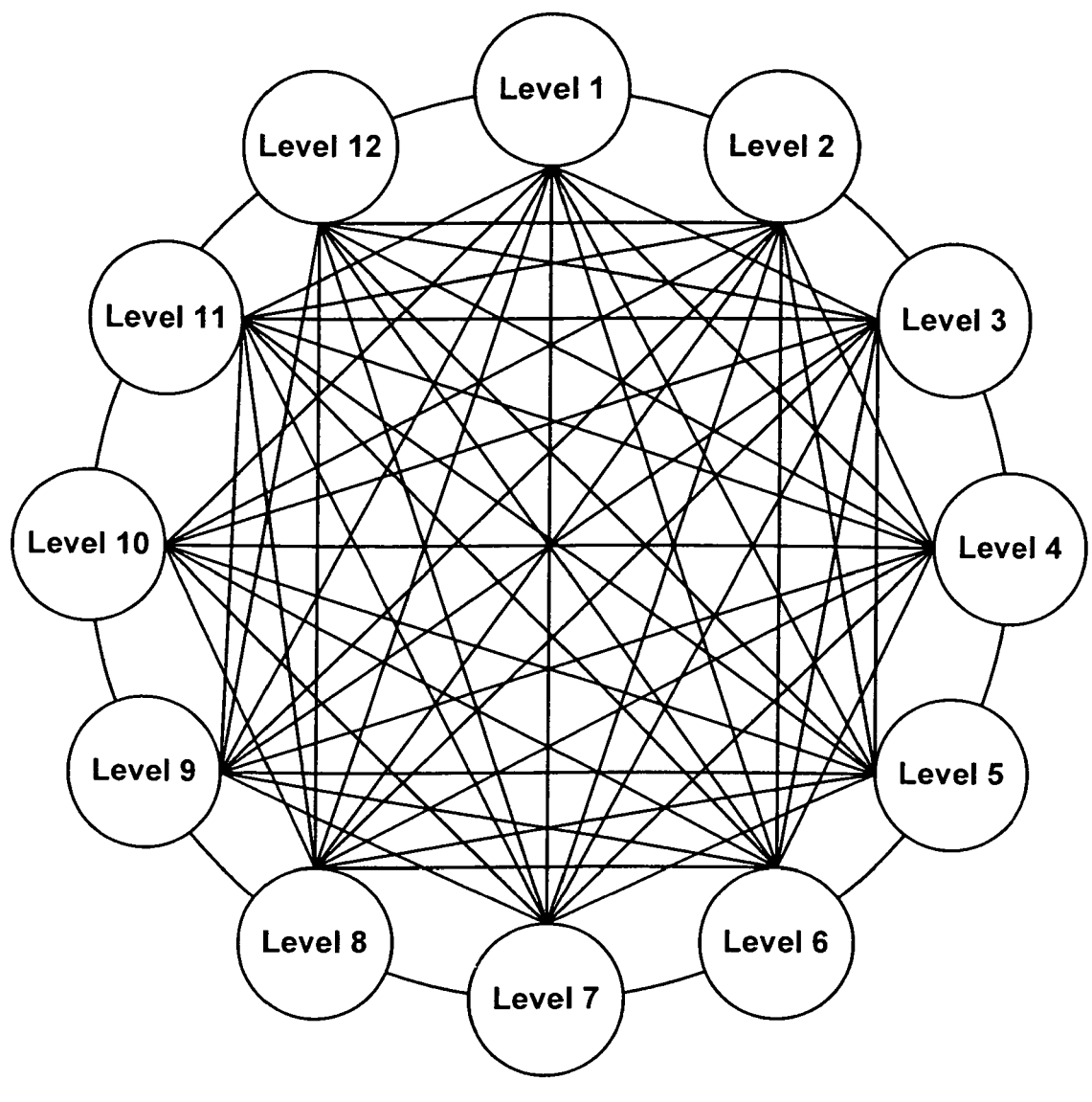
FIG. 6 shows the 12 Levels of the Trigger Mesh and the possible paths from each level to other levels in an example Replay Analyzer.
Figure 7:
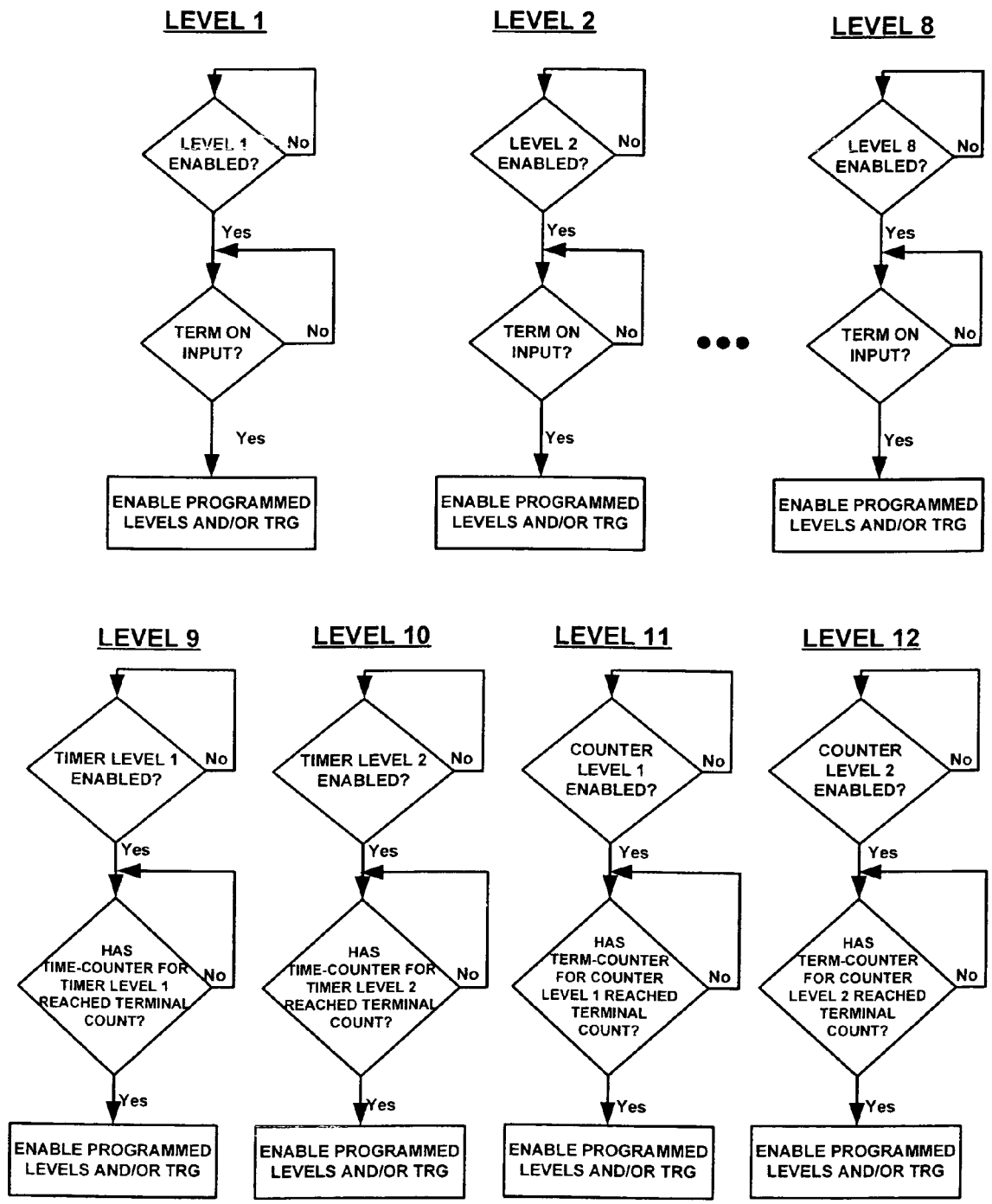
FIG. 7 is an example flow diagram of eight term levels, the two timer levels, and the two counter levels in the Trigger Sequencer of a Replay Analyzer.

The Trigger Sequencer:

An embodiment of the Trigger Logic uses a Trigger Sequencer. The Trigger Sequencer can use a state-machine architecture, capable of changing states on a single clock cycle. One additional feature of the Trigger Sequencer state machine is that up to 12 states (also called levels) can be enabled simultaneously. As shown by example in FIG. 6, each level of the state machine 6001 can enable any or all of the other levels upon exiting the level. FIG. 7 is an example flow diagram of eight term levels, the two timer levels, and the two counter levels in the Trigger Sequencer of a Replay Analyzer. Each of the 12 levels in the Trigger Sequencer consists of a term or count that it waits for as its input, and a 13-bit "THEN" register which is programmed with up to 12 states (levels) that will be enabled once the input becomes true, and is also programmed to generate the TRG signal (1-bit). This architecture allows the user to program the sequencer using a familiar If/Then/Elself structure. Each Level can be enabled singly, or enabled at the same time as any or all of the other levels. This ability to have multiple levels enabled at one time makes it possible to create Elself structures. When started, the trigger sequencer has Level 1 enabled. When the event which Level 1 is waiting for occurs, the sequencer enables the next level(s) using the "THEN" register contents. If a single bus event satisfies the input conditions of multiple enabled levels, the "THEN" registers for all satisfied levels are used to enable the next levels. Eight of the levels simply wait for their specific term to become true. Two levels are Counter levels which wait for their term-counter to reach its terminal count. Two levels are Timer Levels which wait for their time-counter to reach its terminal count. During Capture, the TRG signal is stored in the Buffer so that the trigger position can easily be identified.

Event Statistic Counters:

The example Replay Analyzer has six Event Statistic Counters 203 as indicated in FIG. 2. These counters are incremented each clock cycle that the input term feeding the counter is true. The counters can be reset individually by the user interface, and will roll over once the maximum count is reached. In order to maintain larger counts than the number of bits in the counter, host software must read these counters more frequently than the shortest possible rollover period. By reading the counters this frequently, host software can ensure every counter rollover is counted. Although the preferred embodiment uses terms to perform the pattern matching, it is anticipated that an alternate implementation would compare the incoming data using a Content Addressable Memory (CAM) device, or a sequence of terms, instead of a single term, and the Event Statistic Counters would be incremented by the FOUND output signal of the CAM device. Ternary CAM devices allow for inclusion of Dontcare values in the comparison. Such architecture makes it possible to keep statistics on larger sequences of events without creating special input channels with the adapter pod. Using a CAM instead of a term, up to the word size of the CAM can be used to compare packet data. During Capture, the Event Statistic Counters gather real-time statistics from the bus. During replay, the Event Statistic Counters are used to gather statistics on trace data very quickly for up to six different events. The terms (or CAM or sequence) can then be changed and an entirely different set of statistics can be gathered on the same trace data by replaying again.

Figure 8:
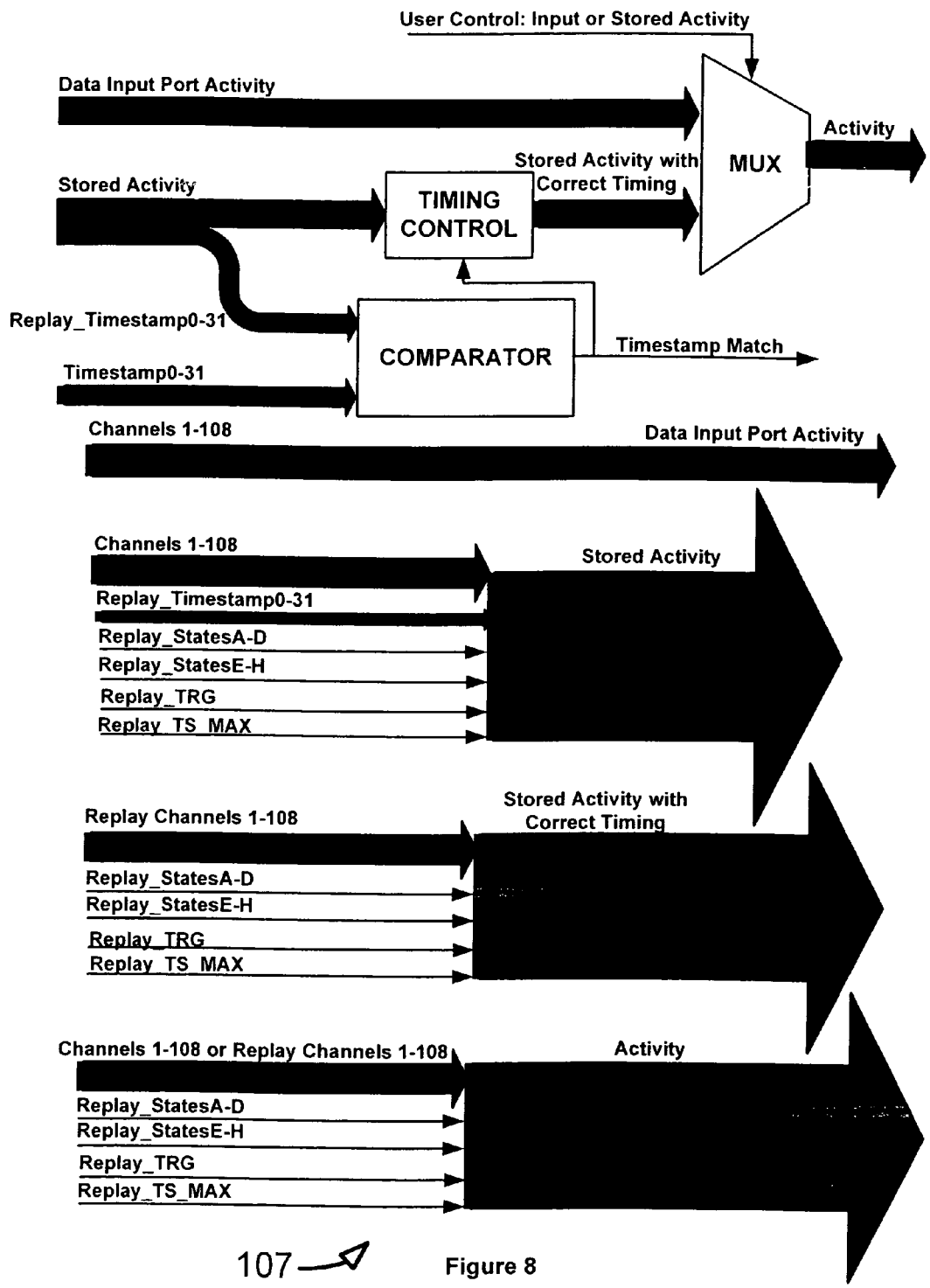
FIG. 8 is an block diagram of example Replay Logic showing the inputs and outputs of each block within the Replay Logic in a Replay Analyzer.

Replay Logic:

As shown in FIG. 8, the Replay Logic 107 (initially depicted in FIG. 1) selects whether the source of data presented to all internal analyzer functions is the Input Adapter Pod, or the Trace Buffer. Replaying the captured data is useful for generating traffic, or for high-speed processing, analyzing, and sorting of the trace data. If the replay is for traffic generation purposes, the Replay Output Port and Output Adapter Pod are enabled during the replay. Otherwise, the Replay Output Port and Output Adapter Pod are disabled. A Replay operation can replay the entire trace or any portion of it. The starting address is controlled by loading the Address Counter in the Trace Buffer Controller with the desired starting address. The stopping address is controlled by the value loaded into the LAST_ADDRESS register. The Last Address register is the same register used to stop a trace capture when the stop mode is configured for Stop When Buffer Full. Similar to a trace capture, the replay operation can be stopped manually at any time by asserting the DONE signal. During replay processing of trace data, the trigger can be used to stop the replay after an event or event sequence, similar to a trace capture.

Figure 9:
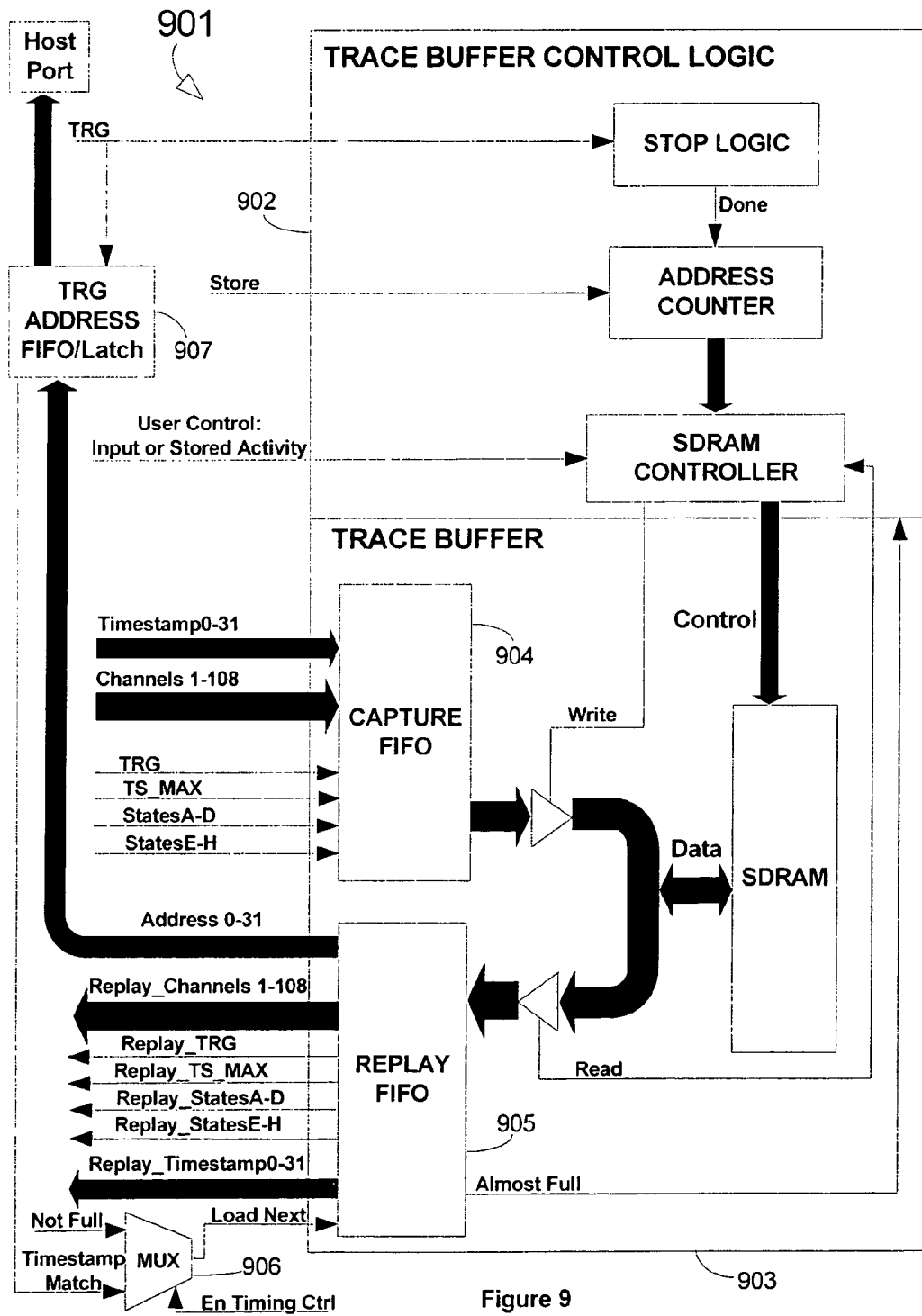
FIG. 9 is a Block Diagram of example Trace Buffer Control Logic and the Trace Buffer, showing the inputs and outputs of each block in a Replay Analyzer.

FIG. 9 is a Block Diagram 901 of example Trace Buffer Control Logic 902 and the Trace Buffer 903, showing the inputs and outputs of each block in a Replay Analyzer. As shown in FIG. 9, the TRG ADDRESS FIFO 907 latches the address value on the output of the Replay FIFO 905 when the TRG signal is asserted. This latched trigger address is used by software during or after a replay operation to determine which replayed addresses resulted in a trigger. There is sufficient pipelining before the TRG ADDRESS FIFO to ensure it latches the correct address when TRG is asserted. The TRG ADDRESS FIFO asserts the Not_Full output to continue loading events during the replay. Not_Full is used to indicate that there is more room for trigger addresses in the TRG ADDRESS FIFO. The host can select from two sources to assert the Load_Next signal during the Replay. By asserting the En_Timing_Ctrl signal, the host selects the Timestamp Match signal from the Timing Control Comparator as the Load_Next signal. Otherwise, the Not_Full signal from the TRG ADDRESS FIFO is chosen. The source of Load_Next will be the Timestamp Match if the trace is being replayed with correct timing. Otherwise it will be the Not_Full signal from the TRG ADDRESS FIFO if the trace is being replayed to sort trace data. The TRG ADDRESS FIFO allows the host to continuously read the location of trigger events during replay without the delays associated with stopping and restarting a replay operation. Two significant advantages result from using a TRG ADDRESS FIFO instead of a single-address TRG ADDRESS LATCH. First, if the user defines specific events to be shown in the Command Listing or State Listing, a replay trigger operation can be used to flag these events very quickly instead of finding the events one-at-a-time. Second, the process of flagging the events in reverse if the user scrolls the filtered Command Listing or State Listing backwards becomes much faster, due to the ability to start the replay thousands or more events prior to the currently displayed location, and flag each trigger sequence occurrence in the forward direction until the currently displayed address location is reached. The TRG ADDRESS FIFO makes it possible to perform fast event flagging operations without stopping or restarting a replay operation.

An important feature of the Replay Analyzer is the ability to replay the captured traffic using the same timing it was captured with. This is especially important while replaying the captured data to the Output Adapter Pod, but is also important when replaying the trace to the Trigger Sequencer if the trigger sequence is using the timing levels to trigger on a timing condition. Replaying the trace with correct timing is easier to accomplish if the trace buffer is implemented with SRAM, but if the trace buffer is implemented with DRAM or other memory requiring refresh to achieve a deeper buffer as is the Replay Analyzer's buffer, the occasional pauses for refresh cycles can make it difficult to replay with correct timing. In the Replay Analyzer this problem was solved by using the Replay FIFO 905 on the output of the Trace Buffer, and by driving the Trace Buffer with a slightly higher clock frequency than the original sample clock. The data is replayed out of the Replay FIFO using the same 250 MHz clock that it was originally sampled with, and the length of the FIFO compensates for the refresh cycles that cause occasional pauses in the loading of the Replay FIFO. Although this works fine if the capture was performed at a fixed frequency of 250 MHz, this technique is insufficient for captures done in Timing Mode since only transitions are captured, and the timing information is contained in the timestamp. In order to replay Timing Mode and State Mode captures with correct timing, the Replay Logic contains a comparator that is loaded with each replay timestamp. During the replay, the replay timestamp is compared with the value from the Timestamp Upcounter, which runs during replay operations just as it does during capture operations. When a match occurs, the Stored Activity from the Replay FIFO is placed on the Stored Activity With Correct Timing bus for output onto the Activity bus which feeds the Output Adapter Pod and Term Logic. When the match occurs, the next event is loaded from the Replay FIFO into the Replay Logic for the next comparison with the Timestamp Upcounter. Since the Replay FIFO is being emptied much slower than it is being filled by the Trace Buffer Controller, an ALMOST_FULL output tells the Trace Buffer Controller to pause loading of the Replay FIFO. The Timestamp Comparator in the Replay Logic can be disabled for replay operations where the original timing doesn't matter, such as when the data is being replayed to the trigger and the trigger is not using its Timer Levels. This significantly improves the speed of a replay trigger or replay statistics operation, allowing the Replay Analyzer to process or sort the trace data at a faster speed than it was captured with. For parallel busses, trace data which is captured in State Mode lacks the detail to produce the replayed data again using the original setup and hold timings, since State Mode typically only saves one sample per data transfer. This limitation forces the user to use Timing Mode to capture the data if they plan to replay it with the original setup and hold timings. For serial busses, this limitation doesn't exist since the SERDES or PHY in the Output Adapter Pod handles the timing and transmits the serialized data using a Reference Clock built into the pod.

As shown in FIG. 9, a MUX 906 may be used to select which of two signals will be used to read events out of the Replay FIFO. The MUX selects between the Not_Full signal from the TRG ADDRESS FIFO, or the Timestamp_Match signal from the Timing Control Comparator. The selection is performed by a configuration signal from the host called En_Timing_Ctrl.

Viewing the Trace:

The Replay Analyzer significantly speeds up the viewing and analysis process by being able to perform almost all decoding, flagging, finding, sorting, statistics, and filtering operations using the high-speed replay capability, using the same triggering and counting hardware that performs similar functions during trace capture. In addition to its ability to show a State Listing of all captured events, the Replay Analyzer can provide a Command Listing, which summarizes each command or packet. The Replay Analyzer creates the Command Listing by using the Trigger Sequencer to locate the next command by triggering on it during a replay operation. The Replay Trigger can locate a specific event or sequence of events in the trace buffer much more quickly than software, thus improving the analyzers trace processing performance.

The Replay Analyzer also gathers statistics on the trace data using a replay operation. Simple statistics such as the number of occurrences of an event, or the ratio of one event to another event can be gathered by defining the terms that feed the Event Statistic Counters, and replaying the trace. At the end of the Replay, the number of event occurrences can be read from the Event Statistic Counters. More complex statistics which involve the time between events, or number of events per second, can be gathered using the Trigger Sequencer to sort the trace for events or event sequences. During a replay, software determines the addresses of events that match the trigger by reading the TRG ADDRESS FIFO. Once the replay is finished, software reads the data and timestamp at those trigger addresses and stores the event type and timestamp information.

The Replay Analyzer supports the ability to hide or filter events that would normally be shown in the Command Listing or State Listing. The Command and State Listings each have a Show/Hide menu that allows the user to define either the events to be shown in the listing, or the events which are hidden; whichever is easier to define. Processing a Show or Hide request from the user is quickly performed using a replay operation. Software configures the replay Start Address and starts the replay operation. The events to be shown or hidden are triggered on during the replay, causing their addresses to be latched into the TRG ADDRESS FIFO. Once the replay is finished, Software then creates the filtered display by showing only the events at addresses that were read from the TRG ADDRESS FIFO. This process can be performed on the entire trace, or only selected portions depending on how much of the buffer must be sorted to gather enough data for a single page of the State Listing or Command Listing.

Trace Buffer and Trace Buffer Control Logic:

As shown in FIG. 9, the Trace Buffer Control Logic performs the addressing, writing, and reading of the Trace Buffer memory. The Trace Buffer Control Logic writes or reads the Trace Buffer at 266 MHz, which provides the additional bandwidth required to be able to pause when necessary and insert a refresh cycle. During Capture operations, the Trace Buffer Control Logic clocks data out of the Capture FIFO into the Trace Buffer while generating the necessary control commands, addressing, and refresh that the SDRAMs require. The Capture FIFO provides sufficient memory that the Selective Capture Logic can continue to send STORE signals while the SDRAM is being refreshed.

During Read or Replay operations, the Trace Buffer Control Logic clocks data into the Replay FIFO, pausing occasionally for refresh cycles. The Replay FIFO is sufficiently large that the Replay Logic can continue to clock data out of the Replay FIFO at 250 MHz without emptying the FIFO before the Trace Buffer Control Logic finishes a refresh and begins filling the FIFO at 266 MHz again.

While systems and methods have been described and illustrated in conjunction with a number of specifics, those skilled in the art will appreciate that variations and modifications may be made without departing from the principles herein illustrated, described, and claimed. The present invention, as defined by the appended claims, may be embodied in other specific forms without departing from its spirit or essential characteristics. The examples and details described herein are to be considered in all respects as only illustrative, and not restrictive. All changes which come within the meaning and range of equivalency of the claims are to be embraced within their scope.

We claim:

1. An analyzer for capturing activity on a transmission medium, comprising:
    a data input port configured to receive the activity from the transmission medium, wherein the data input port includes signal conversion logic configured to convert a signal type used by the transmission medium to a signal type used by the analyzer and wherein the signal conversion logic is further configured to index at least a portion of the transmission medium activity;
    a control port for controlling modes of operation of the analyzer and for accepting user-defined patterns of activity for triggering; and
    replay logic configured to receive the transmission medium activity from the data input port, receive stored activity from a trace buffer, and select one or the other of the transmission medium activity and the stored activity to output to trigger logic, but not both, wherein the trigger logic includes a trigger sequencer that uses a state machine architecture configured to change states and each level of the state machine can enable any or all of the other levels upon exiting the level; and
    trace buffer control logic configured to cause activity received by said replay logic to be read from or written to said trace buffer,
    wherein said trace buffer is configured to receive at least a portion of the transmission medium activity from said replay logic, store the at least a portion of transmission medium activity, send stored activity to said replay logic, and send stored activity to a data output port for processing or display, and
    wherein said trigger logic is configured to compare a pattern of activity received by the replay logic with a first user-defined pattern of activity and to indicate when the comparison results in a match.

2. An analyzer as recited in claim 1 wherein said trace buffer control logic includes logic for overwriting previously stored activity with new activity.

3. An analyzer as recited in claim 1 wherein said trace buffer control logic includes logic for avoiding overwriting previously stored activity with new activity.

4. An analyzer as recited in claim 1 further comprising selective capture logic adapted to cause the trace buffer control logic to cause activity from the replay logic to be written to the trace buffer only when the activity from said replay logic matches a second user-defined pattern of activity.

5. An analyzer as recited in claim 4 wherein said selective capture logic is further adapted to cause information about the type of activity from the replay logic that caused the activity to be written to said trace buffer to be incorporated into the activity stored in the trace buffer.

6. An analyzer as recited in claim 4 further comprising a timestamp counter for creating information about a time of occurrence of each activity event from the replay logic, so that such information may be incorporated into activity stored in said trace buffer,
    wherein said trigger logic is adapted to use time counters such that the pattern comparison is based on a relative time of occurrence of an activity event as indicated by the time counters, and
    wherein said replay logic uses said stored time-of-occurrence information to control a replay timing.

7. An analyzer as recited in claim 6 wherein said replay logic uses the stored time-of-occurrence information to control a replay timing.

8. An analyzer as recited in claim 7 further comprising a replay output port for sending activity from the replay logic to the transmission medium.

9. An analyzer as recited in claim 1 wherein said trigger logic is adapted to recognize, for comparison purposes, patterns of activity that consist of a single event and patterns of activity that consist of a sequence of events.

10. An analyzer as recited in claim 1 wherein said trigger logic includes at least one counter for counting a number of occurrences of an activity event as part of the pattern comparison.

11. An analyzer as recited in claim 1 wherein said trigger logic is adapted to use time counters such that the pattern comparison is based on a relative time of occurrence of an activity event as indicated by the time counters.

12. An analyzer as recited in claim 11 wherein said replay logic uses a fixed time between events to output the stored activity with the same timing with which the stored activity was initially received at the data input port.

13. An analyzer as recited in claim 12 further comprising a replay output port for sending the activity from the replay logic to the transmission medium.

14. An analyzer configurable in a plurality of analyzer modes and for analyzing activity on a transmission medium, comprising:
- (a) a data input port configured to receive the activity from the transmission medium, wherein the data input port includes signal conversion logic configured to convert a signal type used by the transmission medium to a signal type used by the analyzer and wherein the signal conversion logic is further configured to index at least a portion of the transmission medium activity;
- (b) a trace buffer configured to store said received activity;
- (c) replay logic configured to replay stored activity in said trace buffer;
- (d) a control port configured to permit a user to define a plurality of data patterns to be matched in said received activity; and
- (e) trigger logic configured in a first analyzer mode to trigger an action based on a match between any one of said plurality of data patterns and said replayed activity, wherein said trigger logic is further configured to latch address information of said match to a storage area, wherein said storage area is a FIFO, wherein the trigger logic includes a trigger sequencer that uses a state machine architecture configured to change states, wherein each level of the state machine can enable any or all of the other levels upon exiting the level, and wherein the trigger logic allows a user to program the trigger sequencer to enable different states.

15. An analyzer as recited in claim 14 wherein said replay logic is adapted to terminate a replay function on finding a match.

16. An analyzer as recited in claim 14 further comprising means for performing additional analysis of said stored activity.

17. An analyzer as recited in claim 16 wherein said means for performing additional analysis includes means for creating a histogram.

18. An analyzer as recited in claim 16 wherein said means for performing additional analysis uses the same circuitry as said replay and trigger logic.

19. An analyzer as recited in claim 16 wherein said means for performing additional analysis includes means for real time protocol monitoring.

20. An analyzer as recited in claim 16 wherein said means for performing additional analysis includes means for real time statistical analysis.

21. An analyzer as recited in claim 16 wherein said means for performing additional analysis includes means for traffic generation.

22. An analyzer as recited in claim 14 wherein said replay logic function is carried out by a computer chip other than a microprocessor.

23. An analyzer as recited in claim 14 wherein said replay logic is implemented in computer hardware.

24. An analyzer as recited in claim 14 wherein the analyzer is adapted to use shared hardware to perform real time monitoring, preparation of statistical information, post-capture analysis and to replay the stored activity.

25. A replay analyzer comprising:
- a data input port for receiving data from a transmission medium, wherein the data input port includes means for converting a signal type used by the transmission medium to a signal type used by the analyzer and means for indexing at least a portion of the transmission medium data;
- a trace buffer for storing data;
- term logic;
- at least one event statistic counter;
- selective capture logic for determining which data to store in said trace buffer;
- replay logic for replaying data stored in said trace buffer;
- a trigger adapted to trigger on a match with replayed data;
- trigger logic that includes a trigger sequencer that uses a state machine architecture configured to change states and each level of the state machine can enable any or all of the other levels upon exiting the level; and
- a timestamp counter.

26. An analyzer as recited in claim 25 further comprising a timestamp upcounter.

27. An analyzer as recited in claim 25 further comprising a control port for allowing user control of the analyzer.

28. An analyzer as recited in claim 25 wherein said replay trigger is adapted to identify specific data values or events.

29. An analyzer as recited in claim 25 wherein said term logic performs pattern recognition for the analyzer.

30. An analyzer as recited in claim 25 wherein said at least one event statistic counter is adapted to provide long term statistics regarding types of events that are occurring, each event type being defined by a term.

31. An analyzer as recited in claim 30 wherein said terms are selected from the group consisting of command packets, addresses, data transfers, and signal assertions.

32. An analyzer as recited in claim 25 wherein said selective capture logic uses terms from said term logic to capture only incoming activity that matches predefined or user patterns.

33. An analyzer as recited in claim 25 further comprising a trigger sequencer that is capable of triggering said trigger.

34. An analyzer as recited in claim 33 wherein said trigger sequencer is adapted to terminate writing to or reading from said trace buffer.

35. An analyzer as recited in claim 25 wherein the analyzer has a capture mode and a replay mode that are user-selectable.

36. An analyzer as recited in claim 25 wherein said replay logic permits selection of data flow source and direction.

37. An analyzer as recited in claim 36 wherein said data flow source and direction may be selected from (i) a flow starting at said data input port, and to said term logic and said trace buffer, or (ii) from said trace buffer to said trigger.

38. An analyzer as recited in claim 25 further comprising a replay output port.

39. An analyzer as recited in claim 38 further comprising an output adapter means;
- wherein said replay output port and said output adapter means are in data communication with each other so as to transmit data from the analyzer through said output port and through said output adapter means to a bus in order to facilitate traffic generation on the bus.

40. An analyzer as recited in claim 39 wherein activity stored in said trace buffer is used to generate traffic on a bus.

41. An analyzer as recited in claim 25 further comprising a control port through which a local or remote user can configure analyzer logic.

42. An analyzer comprising:
- a control port adapted to permit user configuration of the analyzer,
- a data input port configured to receive a plurality of data channels from a transmission medium, wherein the data input port includes adaptor logic configured to group select ones of the plurality of data channels in dependence on a protocol of the received data;
- a trace buffer configured to store data from said data input port;

trace buffer control logic configured to determine which data from said data input port to store in said trace buffer;

replay logic configured to replay data stored in said trace buffer;

term logic configured to match a desired term with replayed data; and a trigger sequencer configured to use a state machine architecture to trigger on an event, wherein the state machine architecture is configured to change states between 12 levels of state and each level of the state machine can enable any or all of the other levels upon exiting the level and all 12 states can be enabled simultaneously.

43. An analyzer as recited in claim 42 further comprising a selective capture feature.

44. An analyzer as recited in claim 42 wherein said term logic is adapted to perform event pattern recognition.

45. An analyzer as recited in claim 44 wherein said events are selected from the group consisting of high, low, rising edge, falling edge, either edge and dontcare.

46. An analyzer as recited in claim 42 further comprising selective capture logic.

47. An analyzer as recited in claim 42 wherein the analyzer has at least one data capture mode selected from the group consisting of state mode, transitional timing mode, and fixed frequency mode.

48. An analyzer as recited in claim 42 further comprising trigger logic that asserts a trigger signal when data presented to it matches a predefined pattern or sequence.

49. An analyzer as recited in claim 42 further comprising stop logic.

50. An analyzer as recited in claim 42 further comprising trigger logic.

51. An analyzer as recited in claim 42 further comprising an event statistics counter which generates statistical information based on replayed data.

52. An analyzer as recited in claim 42 wherein said replay logic selects whether data presented to internal functions of the analyzer comes from said trace buffer or from said data input port.

53. An analyzer as recited in claim 42 wherein said trace buffer control logic includes stop logic, an address controller, and a memory controller.

54. An analyzer as recited in claim 42 wherein said trace buffer control logic latches an address value of replay data.

55. An analyzer as recited in claim 54 wherein said address value is latched to a FIFO.

56. An analyzer as recited in claim 42 wherein the analyzer is adapted to replay traffic using the same timing that the traffic was captured with.

57. An analyzer as recited in claim 42 wherein the analyzer is adapted to perform decoding, flagging, finding, sorting, statistics and/or filtering operations using triggering and/or counting hardware that are also used for data capture purposes.

58. An analyzer as recited in claim 1, wherein the signal conversion logic is configured to index at least a portion of the transmission medium activity by generating count bits for respective segments of data in the transmission medium activity and sending the transmission medium activity to the replay logic with the generated count bits.

59. An analyzer as recited in claim 42, wherein the transmission medium is a gigabit bus and wherein the adaptor logic is configured to group select ones of the plurality of data channels such that a coding used by the gigabit bus is decoded by the adaptor logic.

60. An analyzer as recited in claim 14, wherein the transmission medium includes a plurality of channels, and wherein said trigger logic is further configured in a second analyzer mode to trigger the action based on an edge occurring on any of the channels.

61. An analyzer as recited in claim 14, wherein said trigger logic includes a logic OR gate that receives a plurality of state terms, each state term corresponding to one of said plurality of data patterns and each state term being asserted true based on a match between the corresponding data pattern and said replayed activity, the trigger logic triggering the action based on an output of the logic OR gate.

62. An analyzer as recited in claim 61, wherein said trigger logic includes a logic AND gate that logically ANDs the output of the logic OR gate with a control signal that is asserted true in the first analyzer mode such that, in a second analyzer mode, triggering the action is not based on the output of the logic OR gate.

* * * * *